J. F. COSTA.
FORMING MACHINE.
APPLICATION FILED APR. 17, 1911.
1,004,852.
Patented Oct. 3, 1911.
4 SHEETS—SHEET 3.
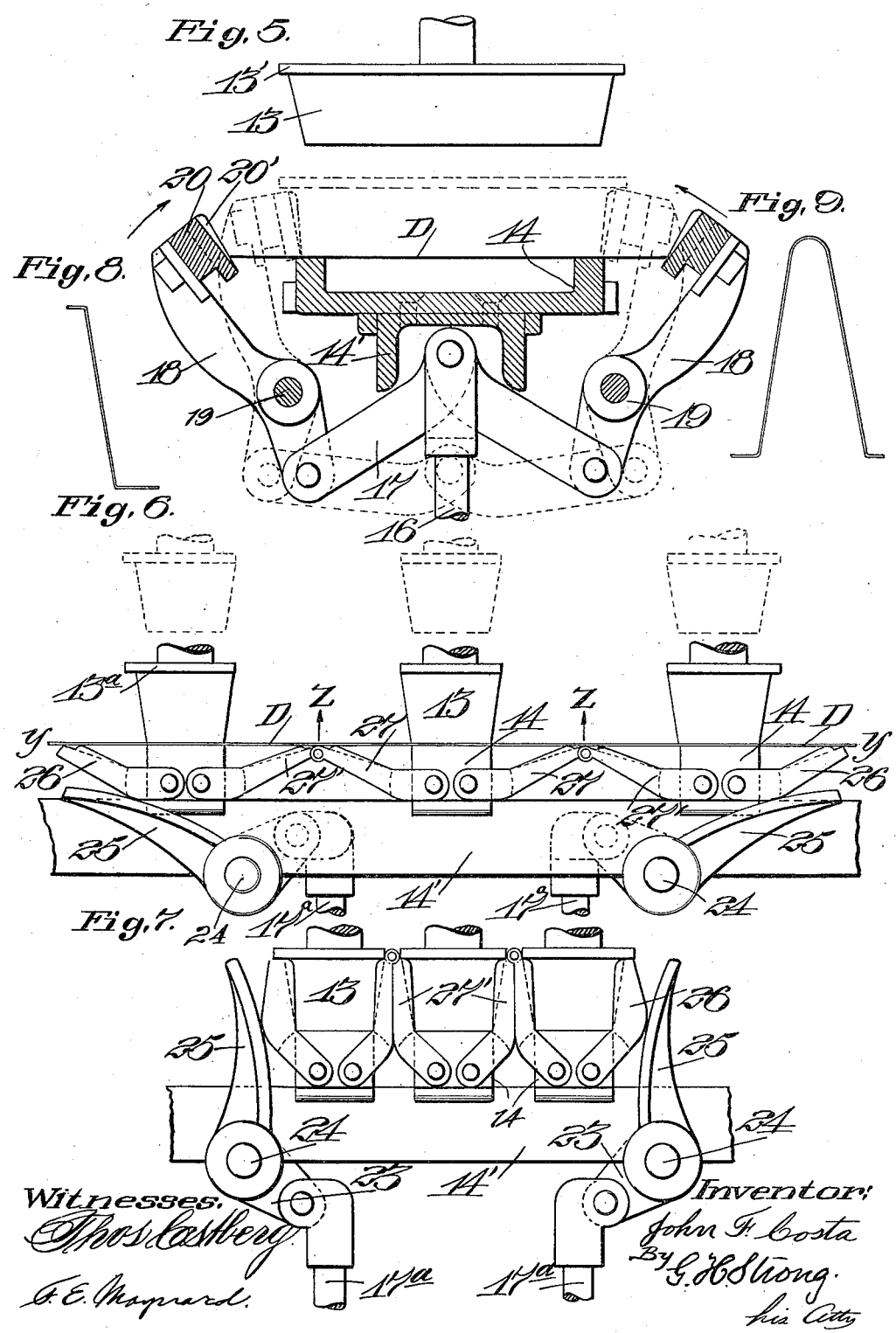

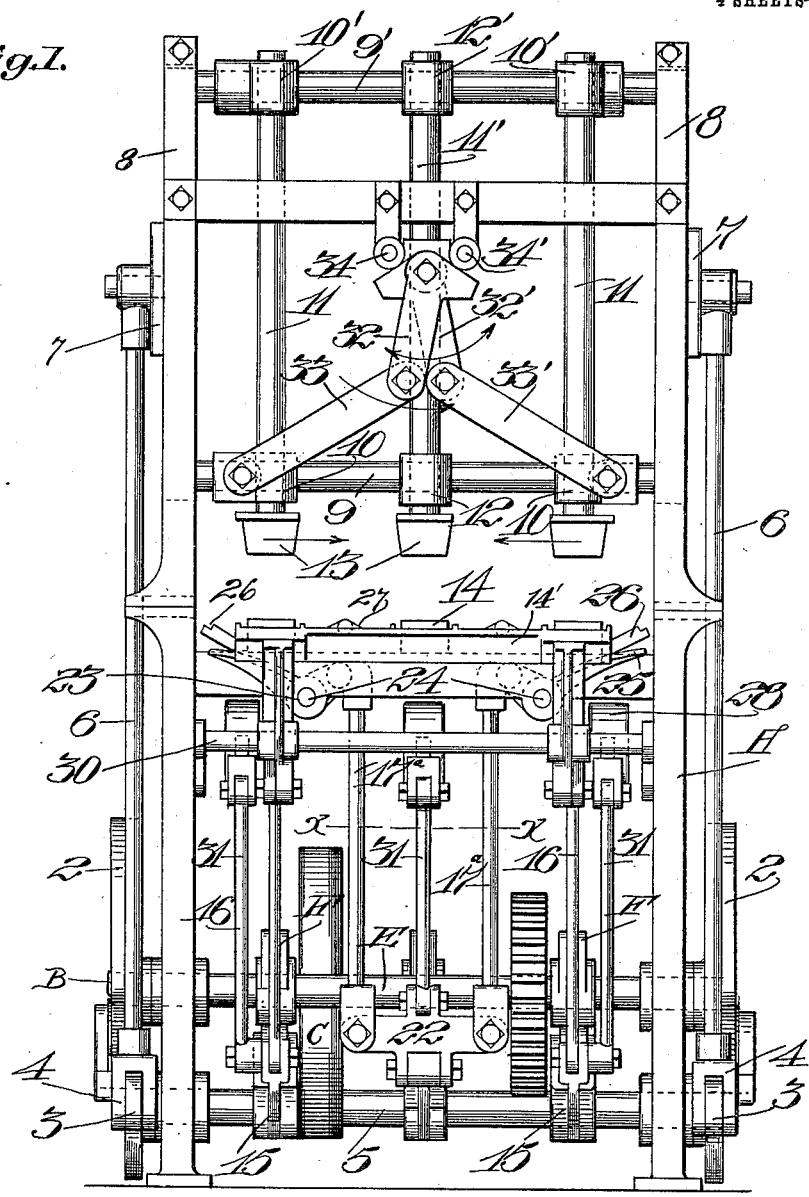

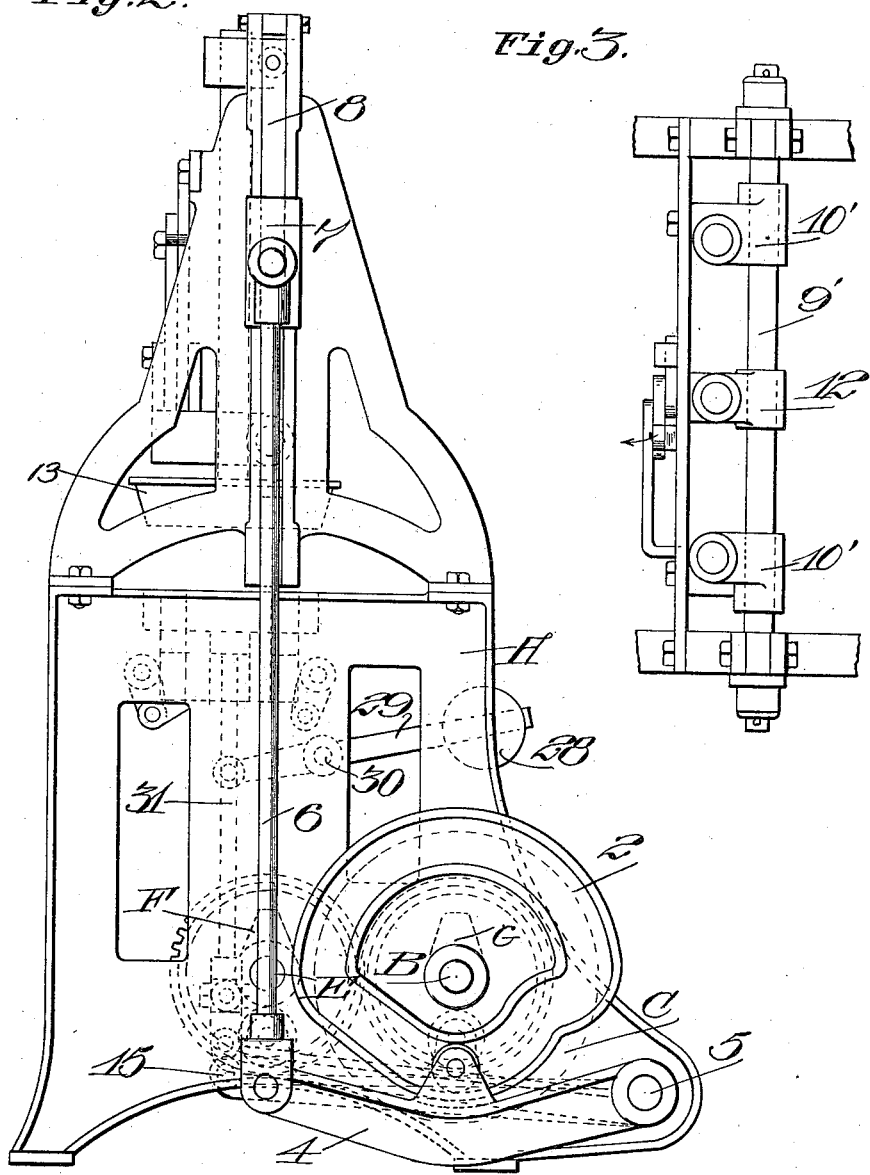

J. F. COSTA.
FORMING MACHINE.
APPLICATION FILED APR. 17, 1911.
1,004,852.
Patented Oct. 3, 1911.
4 SHEETS—SHEET 4.
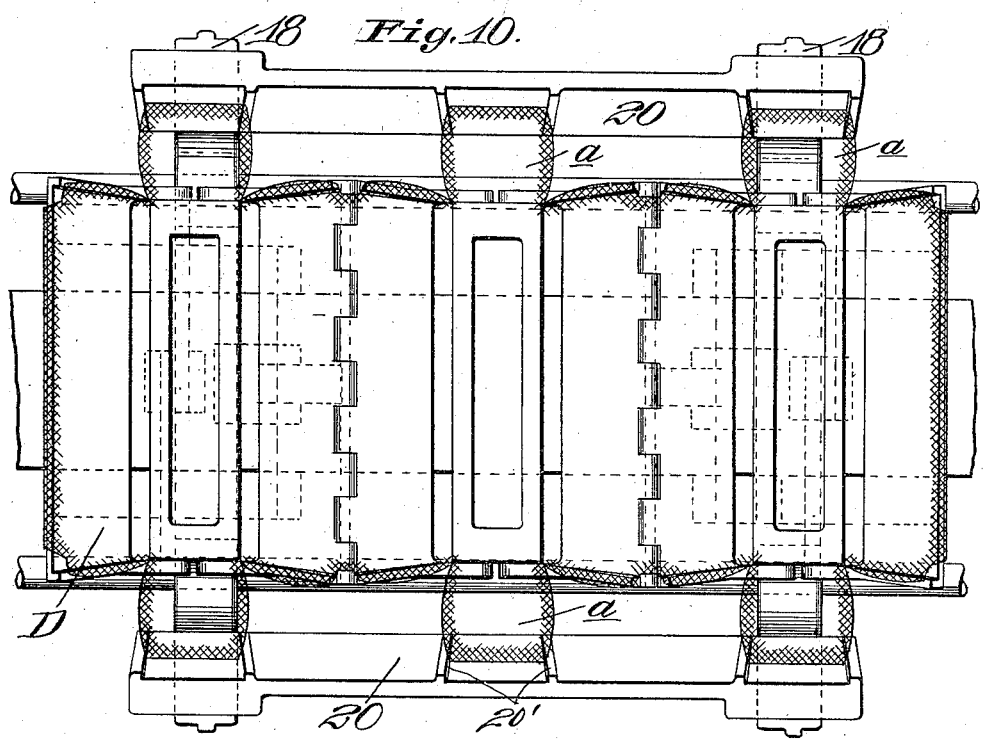
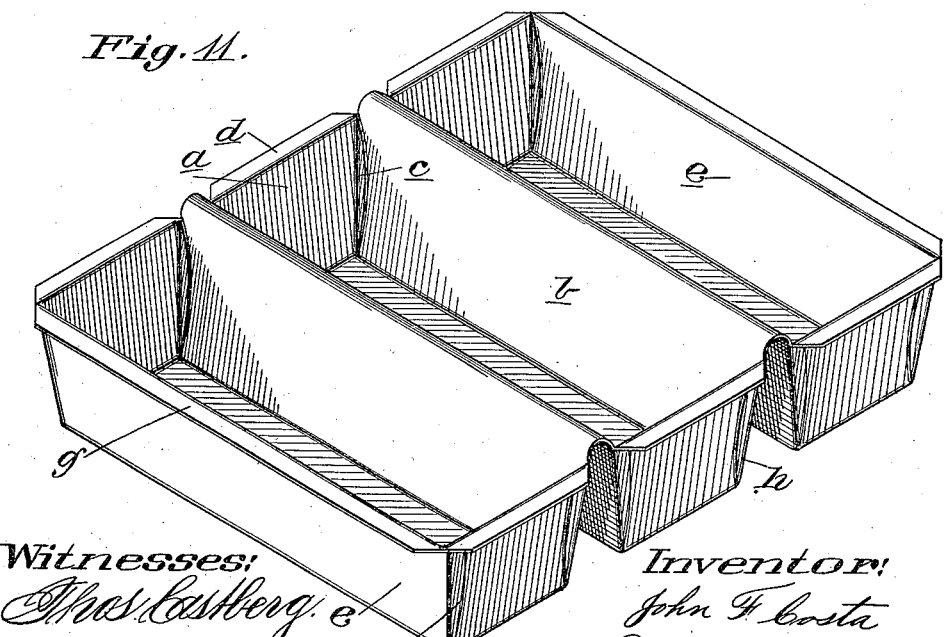
Witnesses:
Thos. Castberg
F. E. Maynard
Inventor:
John F. Costa
By G. H. Strong
his Atty.

UNITED STATES PATENT OFFICE.

JOHN F. COSTA, OF CENTERVILLE, CALIFORNIA.

FORMING-MACHINE.

1,004,852.   Specification of Letters Patent.   Patented Oct. 3, 1911.

Application filed April 17, 1911. Serial No. 621,677.

*To all whom it may concern:*

Be it known that I, JOHN F. COSTA, citizen of the United States, residing at Centerville, in the county of Alameda and State of California, have invented new and useful Improvements in Forming-Machines, of which the following is a specification.

This invention relates to a machine for forming sheet metal blanks and particularly pertains to a mechanism for manufacturing baking-pans.

It is the object of this invention to provide a machine for forming metal blanks into baking pans and which machine is especially adapted for manufacturing the baking pan on which Letters Patent #937,424, were issued to me under date of October 19, 1909.

A further object is to provide a machine of the above character and for the above purpose which is simple in construction and operation and which is rapid in its output.

Other objects will become apparent hereinafter.

The invention consists of the parts and the combination and construction of parts hereinafter more fully described and claimed, having reference to the accompanying drawings, in which—

Figure 1 is a front elevation of the invention. Fig. 2 is a side elevation of same. Fig. 3 is a detail plan view of the upper end of the machine. Fig. 4 is a detail plan view on the line $x-x$ of Fig. 1. Fig. 5 is a detail in section, partly in elevation of the mechanism for forming the ends of the pan. Fig. 6 is a detail in elevation of the mechanism for forming the sides of the pan in the open position. Fig. 7 is a similar view in the closed position. Fig. 8 is a detail in section of the end of the pan as formed by the mechanism shown in Fig. 5. Fig. 9 is a detail in section of the partition formed in the pan by the mechanism shown in Figs. 6 and 7. Fig. 10 is a plan view on the line $y-y$, Fig. 6, showing the blank in diagram as positioned prior to folding. Fig. 11 is a perspective view of the pan formed by mechanisms illustrated in Figs. 6 and 7.

In the drawings A represents the frame of the machine and B is a horizontally disposed drive shaft revolubly mounted thereon, which shaft may be rotated in any suitable manner through a pulley C and is connected with the several operative parts of the machine, as will be later described.

Mounted on each end of the shaft B exterior of the frame A is a grooved cam 2, each of which cams 2 engages a roller 3 on a rocking arm 4 pivoted on the outer end of a shaft 5, mounted on the frame A; the cams 2 being so constructed as to oscillate the rocking arms 4 irregularly. The outer end of each of the rocking arms 4 is pivotally attached to the lower end of a vertically disposed connecting rod 6 which extends upward alongside the frame A and is pivoted at its upper end to a guide block 7 formed on the side members 8 of a cross-head frame, which cross-head is designed to be reciprocated by the oscillation of the rocking arms 4.

The side members 8 of the cross-head are slidable in vertical guides on the frame A and are connected together at their ends by means of horizontally disposed parallel bars 9—9'. Slidably mounted on each of the bars 9—9' is a pair of sleeves 10—10'; the sleeves 10 on the lower bar 9 being connected with the sleeves 10' on the upper bar 9' by means of vertically disposed rods 11, which rods are provided to prevent the sleeves 10 from turning on the bar 9. A similar pair of sleeves 12—12' are rigidly mounted on the bars 9—9' centrally of the length thereof, which are connected together by means of a rod 11'. The lower ends of the rods 11—11' extend below the sleeves 10—12 on the bar 9 and each has a templet or die 13 mounted thereon, which templets or dies are coplanar in relation to each other and conform in shape to the interior of the pan sections, namely, having inwardly sloping or tapered sides.

The dies 13 are designed to be advanced toward and retracted from corresponding shoes 14 mounted on a bed-plate 14' on the frame A, by the movement of the cross-head frame 8, and are designed to rest upon a sheet metal blank D previously placed on the shoes 14, as shown in Figs. 6 and 10, and as later described.

The central shoe 14 is rigidly mounted on the plate 14', while the outermost shoes 14 are slidable thereon; these outermost shoes 14 being adapted to be advanced toward and retracted from the central shoe 14 as will be later described, the several shoes 14 being disposed in coplanar relation to each other.

Pivotally mounted on the shaft 5 near its outer ends is a pair of horizontally disposed levers 15 which extend beneath a counter-shaft E, and are pivotally attached to the lower ends of vertically disposed connecting rods 16, each of which rods terminates in a yoke at its upper end in which a pair of oppositely extending links 17 are mounted, as shown in Fig. 5; the levers 15 being adapted to be rocked downward by cams F on the counter-shaft E and upward by a counter-weight, as later described. The links 17 are connected at their outer ends to levers 18 which are fulcrumed on horizontally disposed parallel shafts 19 situated adjacent the outer longitudinal edges of the shoes 14.

Rigidly mounted on the outer ends of the levers 18 on each shaft 19, is a bar 20, shown in Fig. 10, which is designed to be given an upward and inward movement by the rocking of the levers 18 for the purpose of folding projections a on the blank D against the ends of dies 13 to form the ends of the pan, as later described.

Pivotally mounted on the shaft 5 midway of its length, is a horizontally disposed lever 21, particularly shown in Fig. 4, which extends beneath the drive shaft B and is pivotally connected at its outer end to a cross-head 22. Vertically extending connecting rods 17ª are pivotally attached at their lower ends to the outer ends of the cross-head 22, which connecting rods are pivoted at their upper ends to cranks 23 on a pair of parallel shafts 24, as shown in Figs. 6 and 7. Mounted on each shaft 24 adjacent its ends is a pair of cam-levers 25 which levers are disposed beneath a forming plate 26 pivotally mounted on the ends of the outermost shoes 14, as shown in Figs. 6 and 7, which plates 26 extend the length of the shoes and are designed to be given an upward and inward movement by the rocking of the cam levers 25, as later described, for the purpose of folding the ends of the blank D against the outer side of the outermost dies 13 to form the sides of the pan, and at the same time move the outermost dies toward the center die.

Pivotally mounted on each side of the central die 13 are plates 27 which are hingedly connected at their outer ends to similar plates 27' mounted on the inner side of the outermost dies 13. These plates 27—27' are designed to move upward and inward toward the respective shoes on which they are mounted, as indicated by the arrows Z, when the outer dies 13 are moved toward the center die, as before mentioned, so as to press the blank D upward to form a pair of parallel partitions in the pan, as shown at p, Fig. 11.

The levers 18 and cam-levers 25 are normally retained in their lowermost positions by means of counter-weights 28 mounted on levers 29, fulcrumed on a shaft 30, the inner ends of which levers are pivotally attached to the upper ends of connecting rods 31, the lower ends of which rods are attached to the outer ends of the levers 15 and the cross-head 22, as shown in Fig. 1.

The outermost dies 13 are designed to be restored to their normal positions, after being advanced toward the central die 13 by the action of the cam-levers 25, by means of a pair of bell-crank levers 32—32', mounted on the bar 11', the long arms of which are connected by links 33—33' to the sleeves 10 on which the dies 13 are mounted. These bell-crank levers 32—32' are actuated by means of stationary abutment rollers 34—34' mounted on a head bar on the frame A, which rollers engage and bear upon the short arms of the bell-crank levers 32—32' when the latter are moved upward with the bar 11' on the cross-head 8, so as to cause the sleeves 10 to slide outward on the bar 9 away from the center sleeve 12.

The various working parts of the machine are normally positioned in relation to each other as shown in Fig. 1, prior to the pan forming operation. In this position the cross-head carrying the dies 13 is in its uppermost position; the outer dies 13 are in their outermost position above the outermost shoes 14; and the end forming, side forming, and partition forming plates 20—26 and 27—27', respectively, are in their lowermost positions. A peculiarly shaped sheet metal blank D is then placed on the shoes 14 beneath the dies 13, as shown in Figs. 5—6 and 10, whereupon the machine is set in motion by rotating the pulley C. This causes the shaft B with the cam disks 2 and a cam G (Fig. 4) thereon, to revolve, the cams 2 moving the levers 4 downward which pulls on the connecting rods 6 and thereby causes the cross-head 8 to move downward to position the dies 13 and the blank D, as shown in Fig. 6. The cams 2 are so shaped as to retain the dies 13 in their lowermost position for some time, during which time the counter-shaft E is rotated by a geared connection with the shaft B so as to cause the cams F to bear down upon the levers 15 and thereby cause the rods 16 to move downward, which movement rocks the levers 18 and causes the end forming plates 20 to move upwardly and inwardly so as to fold the projections $a$ on the blank D against the ends of the dies 13; ribs 20′ on the plates 20 folding the edges of the projections $a$ around the corners of the dies 13 to form inwardly projecting flanges $c$ on the sides of the end folds $a$ of the pan, as shown in Fig. 11. The projections $a$ are of such length that when folded against the dies 13, a flange 13′ on the upper edge of the die will cause the upper edge of the end fold to bend outwardly over the upper edge of the plates 20 to form a horizontally extending flange $d$, as shown in Figs. 8 and 11. This being done the plates 20 are retracted by means of the counter-weights 28 connected thereto, the cams F moving out of their operative position to admit the levers 15 to return to normal, whereupon the cam G on the shaft B engages the lever 21 so as to rock the latter in a downward direction and thereby cause the rods 17 to rock the cam-levers 25 upwardly and inwardly, which movement is transmitted to the plates 26 so as to cause the ends of the blank D to fold against the outer faces of the dies 13 to form the sides $e$ of the pan; ribs 26′ on the plates 26 folding the edge of the sides $e$ around the previously folded ends $a$ as shown at $f$ in Fig. 10, and flanges 13ᵃ on the dies 13 turning the outer edges of the sides $e$ to form flanges $g$ on the upper edges thereof. Continued movement of the cam-levers 25, causes the outermost dies 13 to move inwardly toward the central die 13 as shown in Fig. 7, which causes the plates 27—27′ to move upwardly and thereby double the blank D into the shape shown in Fig. 9 by which action the partitions $b$ are formed; ribs on the outer edges of the plates 27—27′ folding projections on the edge of the blank D around the ends of the central end section $a$ as shown at $h$ in Fig. 11. The foregoing being accomplished, the die-carrying cross-head is moved upward to withdraw the dies 13 from the now finished pan, which is removed from the machine by lifting it upward a short distance and withdrawing it from under the elevated dies 13. The outermost dies 13 on reaching their uppermost limits of travel are retracted as before described, by the action of the bell-crank levers 32—32′, and the outermost shoes 14 are caused to assume their normal position as soon as the pan is removed by the spreading action of the hinged plates 27—27′, the weight of these plates bearing against the movable shoes to move them away from the stationary shoe; the cam-levers 25 of course having previously been restored to their normal position by the action of the counter-weight 28 connected therewith through the rod 31 and cross-head 22.

Having thus described my invention, what I claim and desire to secure by Letters Patent is—

1. The combination of a plurality of shoes substantially in one plane and a corresponding series of substantially coplanar dies, partition-forming links pivoted to the shoes, outer wall forming links, and means to simultaneously move the dies toward the shoes and to move the shoes toward each other and the dies toward each other.

2. In a pan making machine, a fixed shoe, a pair of movable flanking shoes, corresponding fixed and movable dies, forming devices between the shoes and dies, and means for operating the dies and forming devices to fold a single sheet simultaneously about the several dies.

3. In a pan making machine, a fixed shoe, a pair of movable flanking shoes, corresponding fixed and movable dies, forming devices between the shoes and dies, and means for operating the dies and forming devices to fold a single sheet simultaneously about the several dies, said shoes constructed and arranged so as to maintain their top surfaces always in the same planes 4. In a sheet metal forming machine, the combination of a plurality of spaced dies, a cross-head on which said dies are mounted, means for intermittently reciprocating said cross-head and dies in a vertical direction, a plurality of shoes corresponding to said dies, said means adapted to hold said dies momentarily in contact with the upper surface of a sheet metal blank on said shoes, and means for bending the sides and ends of the blank around the ends and sides of said dies.

5. In a sheet metal forming machine, the combination of a plurality of spaced dies, a cross-head on which said dies are mounted, means for intermittently reciprocating said cross-head and dies in a vertical direction, a plurality of shoes corresponding to said dies, said means adapted to hold said dies momentarily in contact with the upper surface of a sheet metal blank on said shoes, means for bending the sides and ends of the blank around the ends and sides of said dies, and means for advancing and retracting the outermost shoes and dies in a horizontal direction.

6. In a sheet metal forming machine, the combination of a plurality of spaced, reciprocating dies, shoes corresponding to said dies, means for momentarily holding said dies on a sheet metal blank, means for bending projections on the edge of the blank around the ends of said dies, separate means for bending the ends of the blank around the sides of the outermost dies, and means for advancing the outermost shoes and dies in unison toward each other, and means by which the advancing movement of the shoes will form raised folds in the blank.

7. In a sheet-metal forming machine, the combination of a plurality of spaced, reciprocating dies, shoes corresponding to said dies, means for momentarily holding said dies on a sheet-metal blank, means for bending projections on the edge of the blank around the ends of said dies, separate means for bending the ends of the blank around the sides of the outermost dies, means for advancing the outermost shoes and dies in unison toward each other, means by which the advancing movement of the shoes will form raised folds in the blank, means for reciprocating said dies, and means by which the upward movement of said dies will cause the outermost dies to retract from each other.

8. In a sheet-metal forming machine, the combination of a plurality of spaced, reciprocating dies, shoes corresponding to said dies, means for momentarily holding said dies on a sheet-metal blank, means for bending projections on the edge of the blank around the ends of said dies, separate means for bending the ends of the blank around the sides of the outermost dies, means for advancing the outermost shoes and dies in unison toward each other, means by which the advancing movement of the shoes will form raised folds in the blank, means for reciprocating said dies, means by which the upward movement of said dies will cause the outermost dies to retract from each other, and means for retracting the blank-bending means from the formed article.

9. In a pan-making machine, the combination with a fixed shoe and a vertically reciprocating die corresponding thereto, of a pair of flanking movable shoes on opposite sides of the fixed shoe in coplanar relation therewith, a corresponding pair of horizontally and vertically movable dies flanking the die over the fixed shoe, means for advancing and retracting said dies to and from said shoes, and mechanism for advancing the flanking shoes and dies toward each other when the dies are in their lowermost position.

10. In a pan making machine, the combination with a fixed shoe and a vertically reciprocating die corresponding thereto, of a pair of flanking movable shoes on opposite sides of the fixed shoe in coplanar relation therewith, a corresponding pair of horizontally and vertically movable dies flanking the die over the fixed shoe, means for advancing and retracting said dies to and from said shoes, mechanism for advancing the flanking shoes and dies toward each other when the dies are in their lowermost position, and linked connections between the fixed shoe and the flanking shoes adapted to move upward as the flanking shoes move inwardly, to fold a sheet metal blank against the sides of the fixed die and the inside of each flanking die.

11. In a pan making machine, the combination with a fixed shoe and a vertically reciprocating die corresponding thereto, of a pair of flanking movable shoes on opposite sides of the fixed shoe in coplanar relation therewith, a corresponding pair of horizontally and vertically movable dies flanking the die over the fixed shoe, means for advancing and retracting said dies to and from said shoes, mechanism for advancing the flanking shoes and dies toward each other when the dies are in their lowermost position, linked connections between the fixed shoe and the flanking shoes adapted to move upward as the flanking shoes move inwardly, to fold a sheet-metal blank against the sides of the fixed die and the inside of each flanking shoe, and means operated by the shoe advancing mechanism for folding the blank against the outer side of each flanking die.

12. In a pan making machine, the combination with a fixed shoe and a vertically reciprocating die corresponding thereto, of a pair of flanking movable shoes on opposite sides of the fixed shoe in coplanar relation therewith, a corresponding pair of horizontally and vertically movable dies flanking the die over the fixed shoe, means for advancing and retracting said dies to and from said shoes, mechanism for advancing the flanking shoes and dies toward each other when the dies are in their lowermost position, linked connections between the fixed shoe and the flanking shoes adapted to move upward as the flanking shoes move inwardly, to fold a sheet metal blank against the sides of the fixed die and the inside of each flanking shoe, means operated by the shoe advancing mechanism for folding the blank against the outer side of each flanking die, and means for folding portions of the blank against the ends of the dies before the flanking dies are advanced.

13. In a pan making machine, the combination with a fixed shoe and a vertically reciprocating die corresponding thereto, of a pair of flanking movable shoes on opposite sides of the fixed shoe in coplanar relation therewith, a corresponding pair of horizontally and vertically movable dies flanking the die over the fixed shoe, means for advancing and retracting said dies to and from said shoes, mechanism for advancing the flanking shoes and dies toward each other when the dies are in their lowermost position, linked connections between the fixed shoe and the flanking shoes adapted to move upward as the flanking shoes move inwardly, to fold a sheet metal blank against the sides of the fixed die and the inside of each flanking shoe, means operated by the shoe-advancing mechanism for folding the blank against the outer side of each flanking die, means for folding portions of the blank against the ends of the dies before the flanking dies are advanced, and means for retracting the flanking dies as they are moved upward from the shoes, and separate means for retracting the flanking shoes after the formed pan is removed.

In testimony whereof I have hereunto set my hand in the presence of two subscribing witnesses.

JOHN F. COSTA.

Witnesses:
 JOHN H. HERRING,
 CHARLES EDELMAN.

Copies of this patent may be obtained for five cents each, by addressing the "Commissioner of Patents, Washington, D. C."